E. M. PIERCE.
STEERING GEAR FOR AUTOMOBILES.
APPLICATION FILED JAN. 16, 1920.
1,369,188.
Patented Feb. 22, 1921.
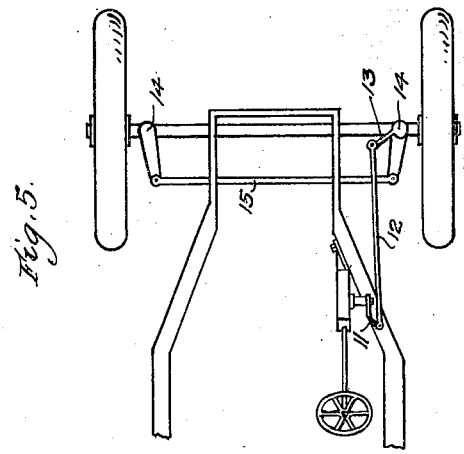
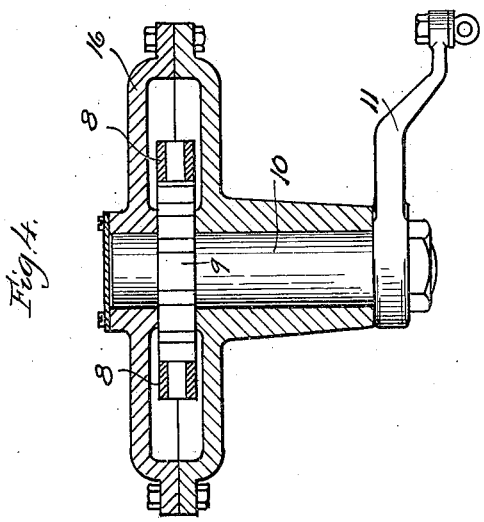
Inventor
E. M. Pierce
By Edward Reed
Attorney

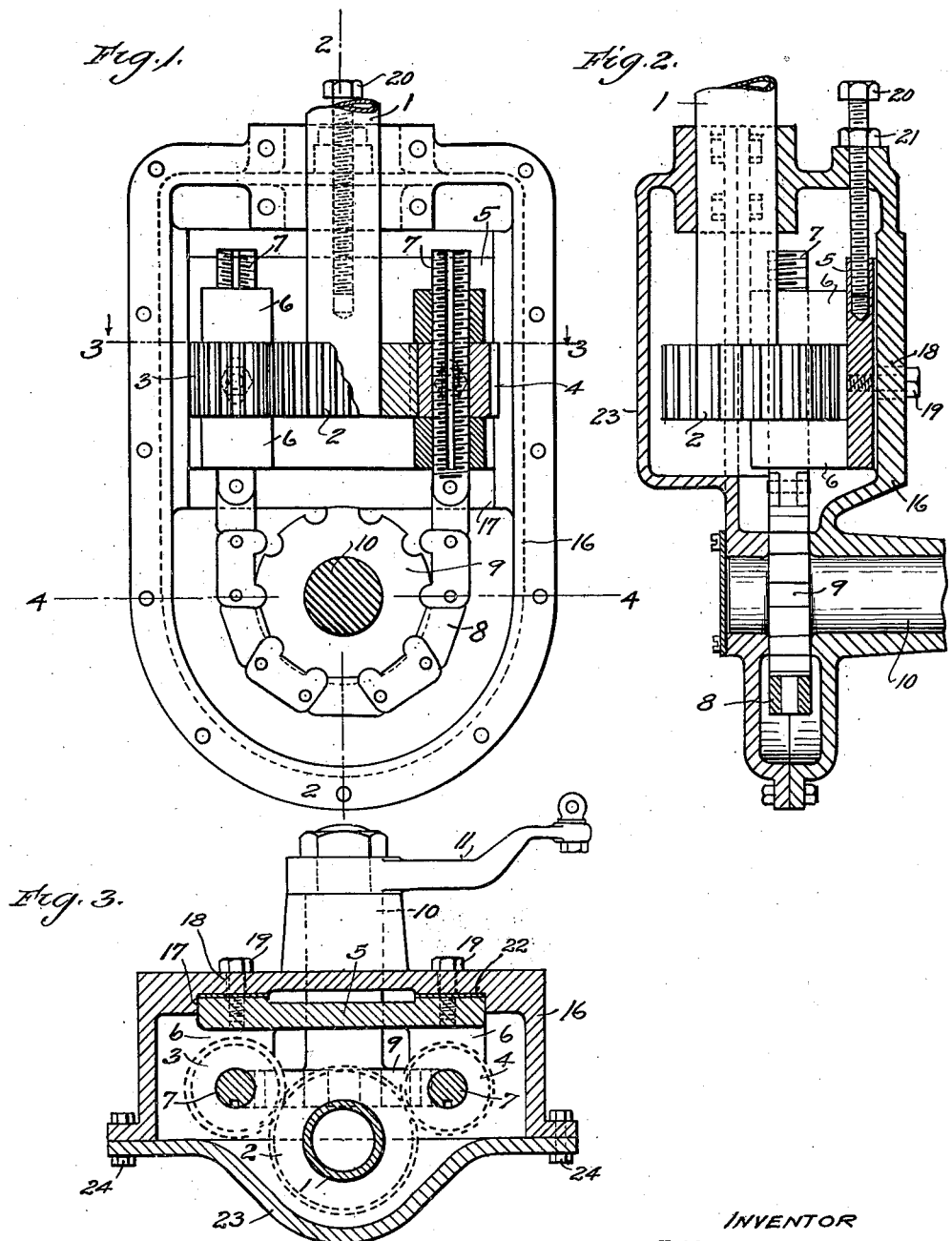

UNITED STATES PATENT OFFICE.

EDWARD M. PIERCE, OF DAYTON, OHIO.

STEERING-GEAR FOR AUTOMOBILES.

1,369,188.  Specification of Letters Patent.  Patented Feb. 22, 1921.

Application filed January 16, 1920. Serial No. 351,859.

*To all whom it may concern:*

Be it known that I, EDWARD M. PIERCE, a citizen of the United States, residing at Dayton, in the county of Montgomery and State of Ohio, have invented certain new and useful Improvements in Steering-Gears for Automobiles, of which the following is a specification, reference being had therein to the accompanying drawing.

This invention relates to a steering mechanism for automobiles and the like.

The object of the invention is to provide a steering mechanism which will absorb the thrust from the wheels and prevent the same from reaching the steering post, thereby eliminating the road shock.

A further object of the invention is to provide a mechanism of this kind which will be of a strong, durable construction; which will be easy to operate; and which will be little subject to wear.

Other objects of the invention will appear as the mechanism is described in detail.

In the accompanying drawings, Figure 1 is a front elevation of a mechanism embodying my invention, with one wall of the casing removed; Fig. 2 is a longitudinal sectional view taken on the line 2—2 of Fig. 1; Fig. 3 is a transverse sectional view taken on the line 3—3 of Fig. 1, looking in the direction of the arrows; Fig. 4 is a transverse sectional view taken on the line 4—4 of Fig. 1; and Fig. 5 is a view of the front end of an automobile chassis showing the invention affixed thereto.

In these drawings I have illustrated one embodiment of my invention and have shown the same as applied to an automobile of ordinary construction. It will be understood, however, that this particular embodiment of the invention has been chosen for the purpose of illustration only, and that the mechanism may take various forms and may be applied to various vehicles without departing from the spirit of the invention.

In that form of the device here shown I have provided the lower end of the steering post, 1, with a gear, 2, which is rigidly secured thereto and which meshes with pinions 3 and 4 mounted upon a supporting structure, or bearing plate, 5, and confined between suitable bearings, 6, which hold the pinions against axial movement. The bore of each pinion is screw threaded to receive a threaded rod, or screw, 7, which is slidably mounted in the corresponding bearings, 6, but is held against rotation in these bearings, preferably by the use of a spline and key. Inasmuch as the screws are held against rotation and the pinions are held against axial movement, it will be apparent that the rotation of the pinions will impart longitudinal movement to the screws, and the respective screws are provided with right and left hand threads so that the rotation of the steering post in one direction will move the screws 7 in opposite directions. The screws 7 are connected with the wheels which are to be steered, that is, the front wheels of an automobile, by a suitable flexible member which coöperates with a rotary member which is connected with the wheels. The flexible member may be of any suitable character, and the rotary member will, of course, be of such a character as to adapt it for coöperation with the flexible member. I prefer that the flexible member should be in the form of a sprocket chain, and I have here shown at 8 what is known as a silent drive chain, which extends about a sprocket wheel, 9, which it rotatably mounted on an axis extending transversely to the steering post and has a stud, or shaft, 10 projecting from one side thereof, to which is rigidly secured an arm 11. The arm 11 is connected with the wheels by means of a link bar, 12, which is pivotally connected at one end with the arm 11 and at the opposite end with the arm 13 of one of the steering knuckles 14, and inasmuch as the two steering knuckles are, of course, connected one to the other by the connecting bar 15, it will be apparent that the rotation of the sprocket wheel will impart simultaneous steering movement to both wheels. Further, it will be apparent that no reverse movement, or thrust, can reach the steering post because of the screw threaded connections between the post and the sprocket wheel. Further, it will be apparent that the device is of such a character that it is very easy to operate and is of a very strong, durable construction which cannot be easily broken or rendered inoperative. The sprocket chain and sprocket wheel constitute a very simple and highly efficient connection between the screws and wheels, which will easily transmit movements of the steering post to the wheels, and which is not liable to bind or to be in any manner rendered inoperative.

In order that the chain may be regulated I have mounted the bearing plate 5 for adjustment toward and away from the sprocket wheel. In the present construction the mechanism as a whole is mounted in a casing 16, shaped to fit about the mechanism and having its rear wall recessed as shown at 17 to receive the plate 5 and to form a guideway therefor. The plate may be secured to the wall of the casing in any suitable manner and in the present instance I have shown the casing as provided with slots 18, through which extend screws 19, which enter the plate 5 and serve to secure the same rigidly to the casing wall in adjusted positions relative thereto. Lengthwise movement may be imparted to the plate 5, after the screws have been loosened by means of a screw 20 which extends through the end wall of the casing and is threaded into the end of the plate 5. A nut 21 on the screw 19 serves to lock the same in adjusted position and when the bolts have been tightened down the bearing plates and the several parts carried thereby will be held rigidly in their adjusted positions. It will be noted that the arrangement of the screws 19 and 20 is such that they may be manipulated from the outside of the casing 16, thus enabling the adjustment of the chain to be effected without opening said casing. It is desirable that the gear 2 should be adjustable with relation to the gears 3 and 4, to cause them to properly mesh when the mechanism is assembled and to this end I prefer to provide means whereby either the gear 2 or the gears 3 and 4 may be adjusted. In the present instance the bearing for the steering post, which carries the gear 2 is in the end wall of the casing, and I prefer that the adjustment should be secured through the pinions 3 and 4. The present construction permits this to be very readily accomplished by merely inserting, or removing, shims between the plate 5 and the back wall of the casing on which it is mounted, as shown at 22.

The casing 16 may be of any suitable character but it is preferably so constructed that a portion of the same can be readily removed to permit access to be had to the mechanism therein, this being in the present instance accomplished by removing the front plate, or closure 23, which is secured to the body of the casing by bolts 24. I also prefer that the casing should be of such a character that it will constitute an oil receptacle, thus permitting the parts to run in an oil bath, and the present construction is such as to permit this to be advantageously done. It will be noted that the lower portion of the casing is contracted so as to fit snugly about the sprocket wheel 9 and form a small compact oil receptacle.

The operation of the mechanism will be readily understood from the foregoing description thereof, and it will be apparent that I not only have provided a very simple and highly efficient mechanism which is irreversible and will not transmit road shock to the steering wheel, but that the mechanism is very easily operated and is of such a character that it can be produced at a relatively low cost and, further, that it can be applied to automobiles of various kinds without material modification thereof.

While I have shown and described one embodiment of my invention, I wish it to be understood that I do not desire to be limited to the details thereof, as various modifications may occur to a person skilled in the art.

Having now fully described my invention, what I claim as new and desire to secure by Letters Patent, is:

1. The combination with wheels to be steered and a steering post, of a rotatable member operatively connected with said wheels, a flexible member to actuate said rotatable member, and devices connected with the opposite ends of said flexible member to impart lengthwise movement thereto, said devices being operatively connected with said steering post and capable of movement lengthwise thereof in the normal operation of said device.

2. The combination with wheels to be steered and a steering post, of a rotatable member operatively connected with said wheels, a flexible member to actuate said rotatable member, longitudinally movable devices connected with the respective ends of said flexible member, and means operatively connected with said steering post to move said devices, respectively, in opposite directions and lengthwise of said steering post.

3. The combination with wheels to be steered and a steering post of a rotatable member operatively connected with said wheels, a flexible member to actuate said rotatable member, longitudinally movable devices connected with the respective ends of said flexible member, pinions having screw threaded connections with said devices, respectively, and operatively connected with said steering post.

4. The combination with wheels to be steered and a steering post, of a rotatable member operatively connected with said wheels, a flexible member to actuate said rotatable member, rods connected with the respective ends of said flexible member, pinions having screw threaded connections with the respective rods, and a gear connected with said steering post and meshing with said pinions.

5. In a steering device of the character described, a rotatable member, a flexible member to actuate said rotatable member, rods connected with the respective ends of said flexible member, pinions having screw threaded connections with the respective rods, a gear meshing with said pinions, and means for rotating said gear.

6. In a steering mechanism of the character described, a sprocket wheel adapted to be connected with the wheels to be steered, a sprocket chain passing about said sprocket wheel, rods connected with the respective ends of said sprocket chain, pinions having screw threaded connections with the respective rods, a gear meshing with said pinions, and means for rotating said gear.

7. In a steering mechanism of the character described, a rotatable member adapted to be connected with the wheels to be steered, a flexible member having its intermediate portion passing about said rotatable member to actuate the same, longitudinally movable devices supported independently of said flexible member and connected with the respective ends of said flexible member to impart lengthwise movement thereto, and means to actuate said devices.

8. In a steering mechanism of the character described, a rotatable member adapted to be connected with the wheels to be steered, a flexible member passing about said rotatable member to actuate the same, a bearing plate, rods slidably mounted on said plate and connected with the respective ends of said flexible member, pinions mounted on said plate and having screw threaded connections with the respective rods, a gear to actuate said pinions, and means for adjusting said plate toward and from said rotary member to regulate the tension of said flexible member.

9. In a steering mechanism of the character described, an oil tight casing, a rotary member mounted in said casing and having a part extending beyond the same for connection with the wheels to be steered, a flexible member passing about said rotary member to actuate the same, rods connected with the respective ends of said flexible member and capable of longitudinal movement but held against rotary movement, pinions screw threaded onto said rods and held against axial movement, and a gear meshing with said pinions.

10. In a steering mechanism of the character described, an oil tight casing, a rotary member mounted in said casing and having a part projecting beyond the same for connection with the wheels to be steered, a flexible member passing about said rotary member to actuate the same, a plate adjustably mounted within said casing, bearings carried by said plate, rods slidably mounted in said bearings and held against rotation therein, pinions screw threaded onto the respective rods and held against axial movement by said bearings, a gear meshing with said pinions, and means for actuating said gear.

In testimony whereof, I affix my signature hereto.

EDWARD M. PIERCE.